(12) United States Patent
Horiuchi et al.

(10) Patent No.: US 8,050,619 B2
(45) Date of Patent: Nov. 1, 2011

(54) RADIO COMMUNICATION APPARATUS AND RADIO COMMUNICATION METHOD

(75) Inventors: Ayako Horiuchi, Kanagawa (JP); Kenichi Miyoshi, Kanagawa (JP); Tomohiro Imai, Kanagawa (JP); Hiroaki Morino, Tokyo (JP)

(73) Assignee: Panasonic Corporation, Osaka (JP)

( * ) Notice: Subject to any disclaimer, the term of this patent is extended or adjusted under 35 U.S.C. 154(b) by 567 days.

(21) Appl. No.: 12/282,331

(22) PCT Filed: Mar. 29, 2007

(86) PCT No.: PCT/JP2007/056947
§ 371 (c)(1),
(2), (4) Date: Sep. 9, 2008

(87) PCT Pub. No.: WO2007/114287
PCT Pub. Date: Oct. 11, 2007

(65) Prior Publication Data
US 2009/0130975 A1 May 21, 2009

(30) Foreign Application Priority Data
Mar. 31, 2006 (JP) ................................. 2006-100830

(51) Int. Cl.
*H04B 3/36* (2006.01)
(52) U.S. Cl. ............................................ 455/7; 370/315
(58) Field of Classification Search ............. 455/7–11.1, 455/14–25; 370/316, 315
See application file for complete search history.

(56) References Cited

OTHER PUBLICATIONS

International Search Report dated Jul. 3, 2007.
L. Lichuan, et al., "Differential space time block code scheme for cooperative relays in multi-hop sensor networks," Military Communications Conference, 2005. MILCOM 2005. IEEE pp. 436-441, vol. 1, Oct. 20, 2005.
S. Barbarossa, et al., "Distributed space-time coding strategies for wideband multihop networks: regenerative vs. non regenerative relays," Acoustics, Speech, and Signal Processing, 2004. Proceedings. (ICASSP '04). IEEE International Conference on, vol. 4, pp. iv-501-iv-504, May 21, 2004.
S. Barbarossa, et al., "Distributed space-time coding for multihop networks," Communications, 2004 IEEE International Conference on, vol. 2, pp. 916-920, vol. 2, Jul. 20-24, 2004.
T. Miyano, et al., "Cooperative Relaying Technique with Space Time Block Code for Multihop Communications among Single Antenna Terminals," Technical Report of IEICE, A-P2003-342, RCS2003-365, pp. 71-76, Mar. 2004.

*Primary Examiner* — Raymond Dean
(74) *Attorney, Agent, or Firm* — Dickinson Wright PLLC

(57) ABSTRACT

Provided is a mobile communication system capable of obtaining a diversity effect even when a signal received by a relay station has an error in a corporate relay to which time space encoding is applied. In this mobile communication system, when S1 has no error and S2 has an error, a relay station (1) does not perform relay transmission at time t (Null) and relay-transmits S1* to a base station at time t+T. That is, in this case, the relay station (1) relay-transmits at time t+T only S1 to be transmitted at time t when no error is contained in either S1 or S2. Moreover, when S1 has an error and S2 has no error, the relay station (1) relay-transmits S2 at time t and does not perform relay transmission at time t+T (Null). That is, in this case, the relay station (1) relay-transmits only S2 to be transmitted at time t+T at time t if no error is contained in either S1 or S2.

6 Claims, 17 Drawing Sheets

| | | TRANSMISSION AT TIME t IN RELAY STATION 1 (PRIORITY: HIGH) | APPLICABLE | Null |
|---|---|---|---|---|
| | | TRANSMISSION AT TIME t+T IN RELAY STATION 1 (PRIORITY: HIGH) (ASSUMPTION) | −S2* OR NULL | −S1* OR NULL |
| RELAY STATION 2 (PRIORITY: LOW) | S1 : OK , S2 : OK | TRANSMISSION AT TIME t+T | S1* | S1* |
| | S1 : OK , S2 : NG | TRANSMISSION AT TIME t+T | Null | Null |
| | S1 : NG , S2 : OK | TRANSMISSION AT TIME t+T | −S2* | Null |
| | S1 : NG , S2 : NG | TRANSMISSION AT TIME t+T | Null | Null |

FIG.12

| | TRANSMISSION AT TIME t+T IN RELAY STATION 1 (PRIORITY: HIGH) | TRANSMISSION AT TIME t IN RELAY STATION 1 (PRIORITY: HIGH) | |
|---|---|---|---|
| | | APPLICABLE | Null |
| | | -S2* OR NULL | -S1* OR NULL |
| RELAY STATION 2 (PRIORITY: LOW) | S1: OK, S2: OK — TRANSMISSION AT TIME t+T | S1* | S1* |
| | S1: OK, S2: NG — TRANSMISSION AT TIME t+T | Null | S1* |
| | S1: NG, S2: OK — TRANSMISSION AT TIME t+T | -S2* | Null |
| | S1: NG, S2: NG — TRANSMISSION AT TIME t+T | Null | Null |

FIG.13

| TRANSMISSION AT TIME t IN RELAY STATION 1 (PRIORITY: HIGH) | | S1 (SCHEDULED) | Null | S2 (UNSCHEDULED) |
|---|---|---|---|---|
| TRANSMISSION AT TIME t+T IN RELAY STATION 1 (PRIORITY: HIGH) (ASSUMPTION) | TRANSMISSION AT TIME t+T | -S2* | -S1* OR NULL | Null |
| RELAY STATION 2 (PRIORITY: LOW) | S1:OK, S2:OK — TRANSMISSION AT TIME t+T | S1* | S1* | S1* |
| | S1:OK, S2:NG — TRANSMISSION AT TIME t+T | Null | S1* | S1* |
| | S1:NG, S2:OK — TRANSMISSION AT TIME t+T | -S2* | Null | -S2* |
| | S1:NG, S2:NG — TRANSMISSION AT TIME t+T | Null | Null | Null |

FIG.16

RADIO COMMUNICATION APPARATUS AND RADIO COMMUNICATION METHOD

TECHNICAL FIELD

The present invention relates to a radio communication apparatus and a radio communication method.

BACKGROUND ART

In recent years, with the multimediatization of information in cellular mobile communication systems as represented by mobile phones for example, transmitting high capacity data such as still images and movies in addition to speech data has become a norm. To realize high capacity data transmission, a technology of realizing a high-transmission rate using a high-frequency radio band is studied actively.

However, when a high-frequency radio band is used, although a high transmission rate can be expected in a short distance, attenuation due to transmission distance becomes greater as the distance increases. Accordingly, when a mobile communication system utilizing a high-frequency radio band is actually operated, the coverage area of each base station becomes smaller, which then requires setting up a larger number of base stations. Since the setup of base stations involves large costs, a technology is strongly demanded for realizing communication services which control an increase in the number of base stations and utilize a high-frequency radio band.

To meet this demand, studies are underway for relay technologies of providing relay stations between a mobile station and a base station, and allowing communication between the mobile station and the base station via these relay stations. Moreover, one of these relay technologies is cooperative relay where a plurality of relay stations relay in cooperation between the relay stations. In cooperative relay, a receiving apparatus receives relay signals from a plurality of relay stations, so that diversity effect can be obtained even when each relay station has a single antenna. Moreover, studies are underway for a technique adopting space time encoding using STBC (Space Time Block Code) for cooperative relay for improving diversity effect, assuming a plurality of relay stations performing cooperative relay a plurality of antennas (see Non-patent Document 1). Cooperative relay may be also referred to as "collaborative relay." Non-patent Document 1: Tsuyoshi MIYANO, Hidekazu MURATA, and Kiyomichi ARAKI, "Cooperative Relaying Technique with Space Time Block Code for Multihop Communications among Single Antenna Terminals," TECHNICAL REPORT OF IEICE, A•P2003-342, RCS2003-365, pp. 71-76, 2004-03)

DISCLOSURE OF INVENTION

Problems to be Solved by the Invention

According to the technique disclosed in the above document, relay stations decode a received signal and determine whether or not there is an error in the decoding result by CRC (Cyclic Redundancy Check) or the like. Then, when there is no error in a decoding result, the relay stations perform space time encoding and relay transmission on a decoding result, but cancel relay transmission when there is an error in a decoding result. Consequently, with the technique disclosed in the above document, there is a problem that diversity effect cannot be obtained when there is an error in a decoding result.

It is therefore an object of the present invention to provide a radio communication apparatus and radio transmission method for obtaining diversity effect in cooperative relay adopting space time encoding even when there is an error in a signal received by a relay station.

Means for Solving the Problem

The radio communication apparatus of the present invention is a radio communication apparatus that performs relay transmission and adopts a configuration including: a receiving section that receives a plurality of signals; a determination section that determines whether or not there are errors in the plurality of signals; a encoding section that, when there are no errors in the plurality of signals, encodes the plurality of signals by encoding for generating a second signal sequence different from a first signal sequence used in another radio communication apparatus performing relay transmission, and that, when there are errors in one of the plurality of signals, encodes only signals without errors by encoding for generating the first signal sequence; and a transmitting section that transmits the encoded signal.

Advantageous Effect of the Invention

The present invention provides an advantage of obtaining diversity effect in cooperative relay adopting space time encoding even when there is an error in a signal received by a relay station.

BRIEF DESCRIPTION OF DRAWINGS

FIG. 12 shows the operations of the relay station according to Embodiment 3;

FIG. 13 shows the operations of the relay station according to Embodiment 3;

FIG. 16 shows the operations of the relay station according to Embodiment 4.

BEST MODE FOR CARRYING OUT THE INVENTION

Now, embodiments of the present invention will be described in detail with reference to the accompanying drawings. The radio communication apparatus that will be explained below relays a transmission signal transmitted from a first radio communication apparatus to a second radio communication apparatus, and, is mounted in, for example, a relay station used in mobile communication systems. In the following embodiments, the radio communication apparatus that performs relay transmission will be described as a "relay station," the first radio communication apparatus will be described as a "mobile station," and the second radio communication apparatus will be described as a "base station."

Figure 1:
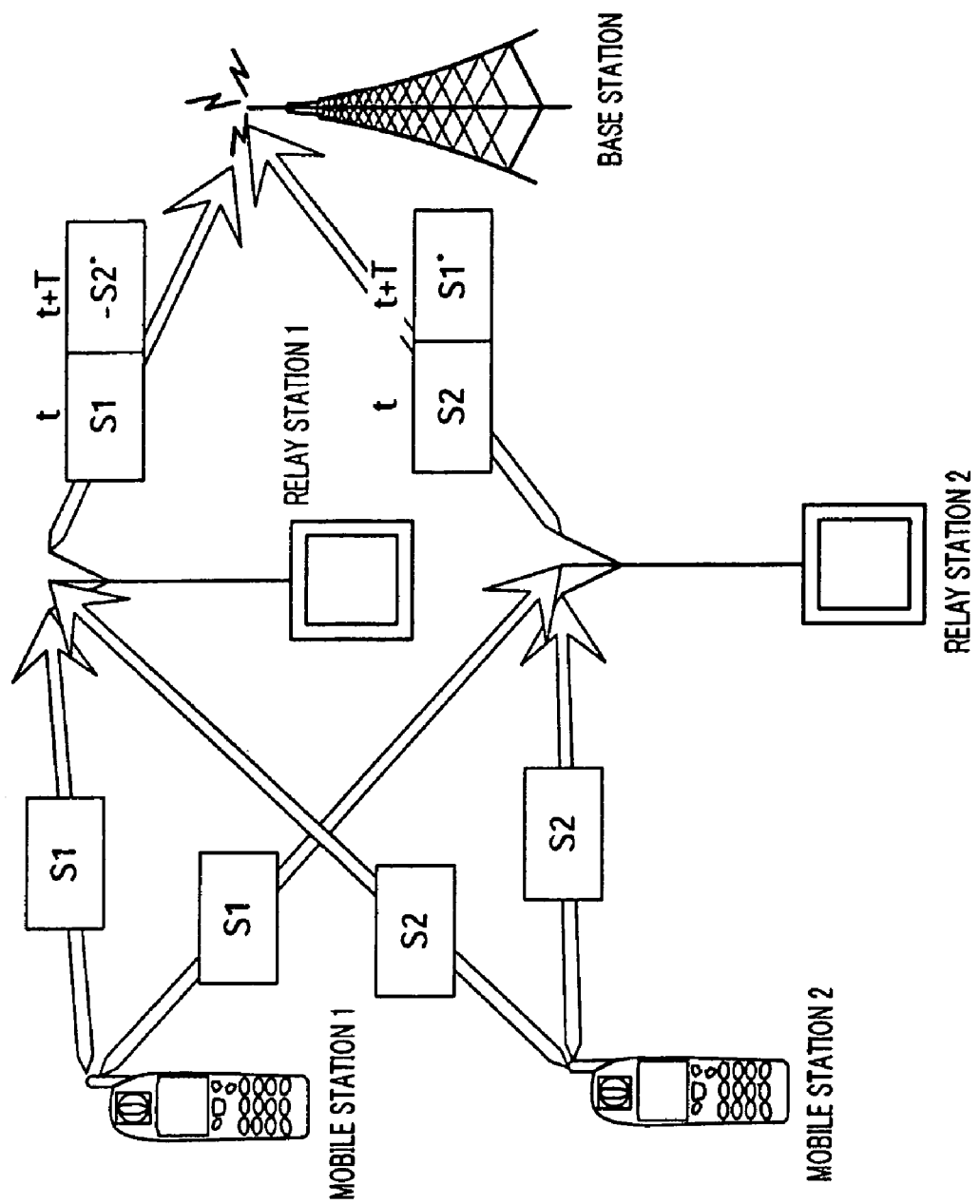
FIG. 1 shows the mobile communication system according to the embodiments.

Moreover, in the mobile communication system according to the embodiments below, as shown in FIG. 1, there are a plurality of mobile stations (mobile station 1 and mobile station 2) and relay stations (relay station 1 and relay station 2), and a plurality of relay stations relay transmission signals from a plurality of mobile stations to the base station. The mobile stations, the relay stations and the base station transmit and receive synchronized signals in frame units having predetermined durations.

Moreover, in the mobile communication system (FIG. 1), relay station 1 and relay station 2 both receive signal S1 from mobile station 1 and signal S2 from mobile station 2. Then, relay station 1 and relay station 2 perform cooperative relay adopting space time encoding using STBC. To be more specific, as shown in FIG. 1, relay station 1 performs space time encoding on S1 and S2 using STBC to generate a signal sequence of S1 and −S2*, and relays S1 at time t and −S2 at time t+T, to the base station. On the other hand, as shown in FIG. 1, relay station 2 performs space time encoding on S1 and S2 using STBC to generate a signal sequence of S2 and S1*, and relays S2 at time t and S1* at time t+T, to the base station. "*" represents complex conjugate.

Here, a signal sequence in Alamouti coding is used as STBC. The signal sequence in Alamouti coding is as shown in the following matrix A.

$$A = \begin{bmatrix} S1 & -S2^* \\ S2 & S1^* \end{bmatrix}_{\downarrow space}^{time \rightarrow \; t \;\; t+T} \quad [1]$$

where the horizontal dimension represents time ("time→") and the vertical dimension representing space ("↓space").

In this mobile communication system (FIG. 1), space time encoding is performed through two relay stations regarded as two antennas, so that relay stations 1 and 2 perform encoding generating each row of matrix A. That is, relay station 1 performs encoding generating the signal sequence of S1 and −S2' of the first row of matrix A, and relay station 2 performs encoding generating a signal sequence of S2 and S1* of the second row of matrix A.

Accordingly, the base station receives $r_1$ (equation 1) at time t and $r_2$ (equation 2) at time t+T. In equations 1 and 2, $h_1$ represents the channel between relay station 1 and the base station and $h_2$ represents the channel between relay station 2 and the base station, and $n_1$ and $n_2$ represent noise.

$r_1 = h_1 S1 + h_2 S2 + n_1$ (Equation 1)

$r_2 = h_1 S2^* + h_2 S1^* + n_2$ (Equation 2)

Then, the base station estimates S1' and S2' through equations 3 and 4.

$S1' = h_1^* r_1 + h_2 r_2$ (Equation 3)

$S2' = h_2^* r_1 - h_1 r_2^*$ (Equation 4)

That is, the base station substitutes equations 1 and 2 into equations 3 and 4 and finds S1' and S2' through equations 5 and 6.

$S1' = |h_1|^2 S1 + |h_2|^2 S1 + h_1^* n_1 + h_2 n_2^*$ (Equation 5)

$S2' = |h_1|^2 S2 + |h_2|^2 S2 + h_2^* n_1 + h_1 n_2^*$ (Equation 6)

S1' and S2' found through equations 5 and 6 have increased noise, but nevertheless have the same form as a maximum ratio combining signal. Accordingly, in this mobile communication system (FIG. 1), the base station can perform maximum ratio combining of the signal from mobile station 1 and the signals from mobile station 2.

In this way, in the following embodiments, relay station 1 and relay station 2 relay cooperatively the signal from mobile station 1 and the signal from mobile station 2, to the base station. Moreover, space time encoding using STBC is adopted in relay transmission. Furthermore, a signal sequence in Alamouti coding above is used as STBC.

The relay stations according to the embodiments below may be set in advance, or other mobile stations may be used as relay stations like the ad-hoc network (for example, see, Japanese Patent Application Laid-Open No. 2001-189971).

Embodiment 1

According to the present embodiment, when there are no errors in S1 and S2, relay station 1 encodes S1 and S2 by encoding generating the signal sequence (the first row of matrix A) that is different from the signal sequence (the second row of matrix A) used in relay station 2. On the other hand, when there is an error in either S1 or S2, relay station 1 encodes only the signal without an error by encoding generating the signal sequence (the second row of matrix A). Moreover, relay station 1 cancels relay transmission of a signal with an error.

When there are no errors in S1 and S2, relay station 1 encodes S1 and S2 and generates the first row of matrix A as explained above, and relays S1 at t and −S2* at t+T to the base station.

Figure 2:
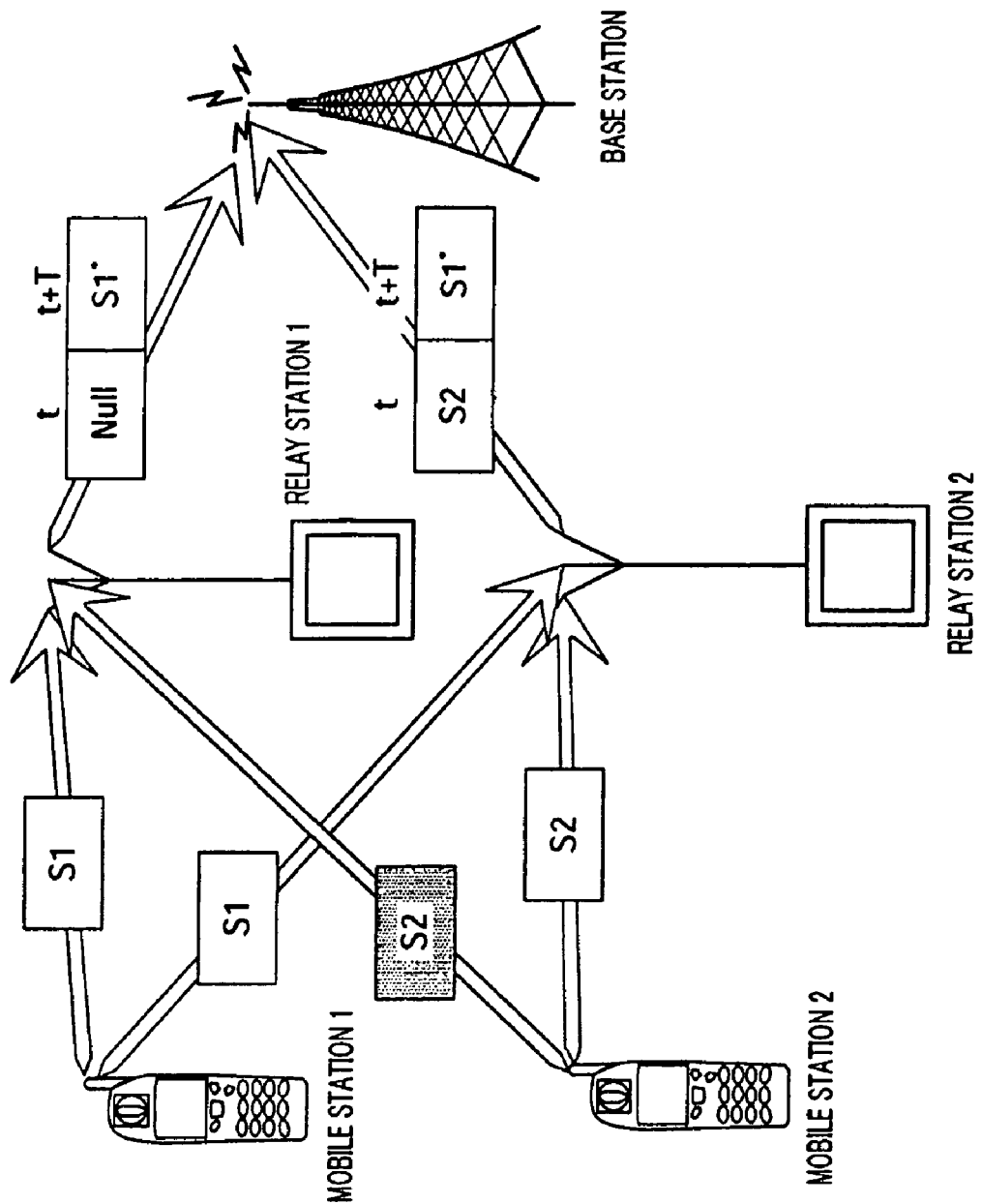
FIG. 2 shows the mobile communication system according to Embodiment 1.

On the other hand, as shown in FIG. 2, when there is no error in S1 and there is an error in S2, relay station 1 cancels relay transmission of S2 and encodes S1 alone and generates the second row of matrix A. Accordingly, relay station 1 does not perform relay transmission (Null) at time t, but relays S1 to the base station at time t+T. That is, in this case, relay station 1 matches S1 scheduled to be transmitted at time t when there are no errors in S1 and S2 with the phase in relay station 2, and relays S1 at time t+T. Consequently, in this case, S1* generated by encoding generating the second row of matrix A in relay station 1 and the signal to be relayed at time t+T from relay station 2 share the same transmission timing and phase.

Moreover, when there is an error in S1 and there is no error in S2, relay station 1 cancels relay transmission of S1, generates the second row of matrix A through encoding S2 alone. Accordingly, relay station 1 relays S2 at time t and does not perform relay transmission (Null) at time t+T. That is, in this case, relay station 1 relays S2 alone which, when there are no errors in S1 and S2, is scheduled to be transmitted at time t+T, at time t. Consequently, in this case, S2 generated by encoding generating the second row of matrix A in relay station 1 and the signal to be relayed at time t from relay station 2 share the same transmission timing and phase.

In this way, when there is an error in either S1 or S2, relay station 1 cancels relay transmission of the signal with an error and matches transmission timing and phase of the signal without an error with transmission timing and phase in relay station 2. In this way, when there is an error in either S1 or S2 in relay station 1, the transmission timing and phase of the signal without an error and the transmission timing and phase in relay station 2 match, so that the base station can obtain diversity effect for the signal without an error. Consequently, according to the present embodiment, in cooperative relay adopting space time encoding, even when diversity effect by encoding using STBC cannot be obtained because there is an error in a signal received by the relay station, it is possible to obtain diversity effect by transmission diversity.

Figure 3:
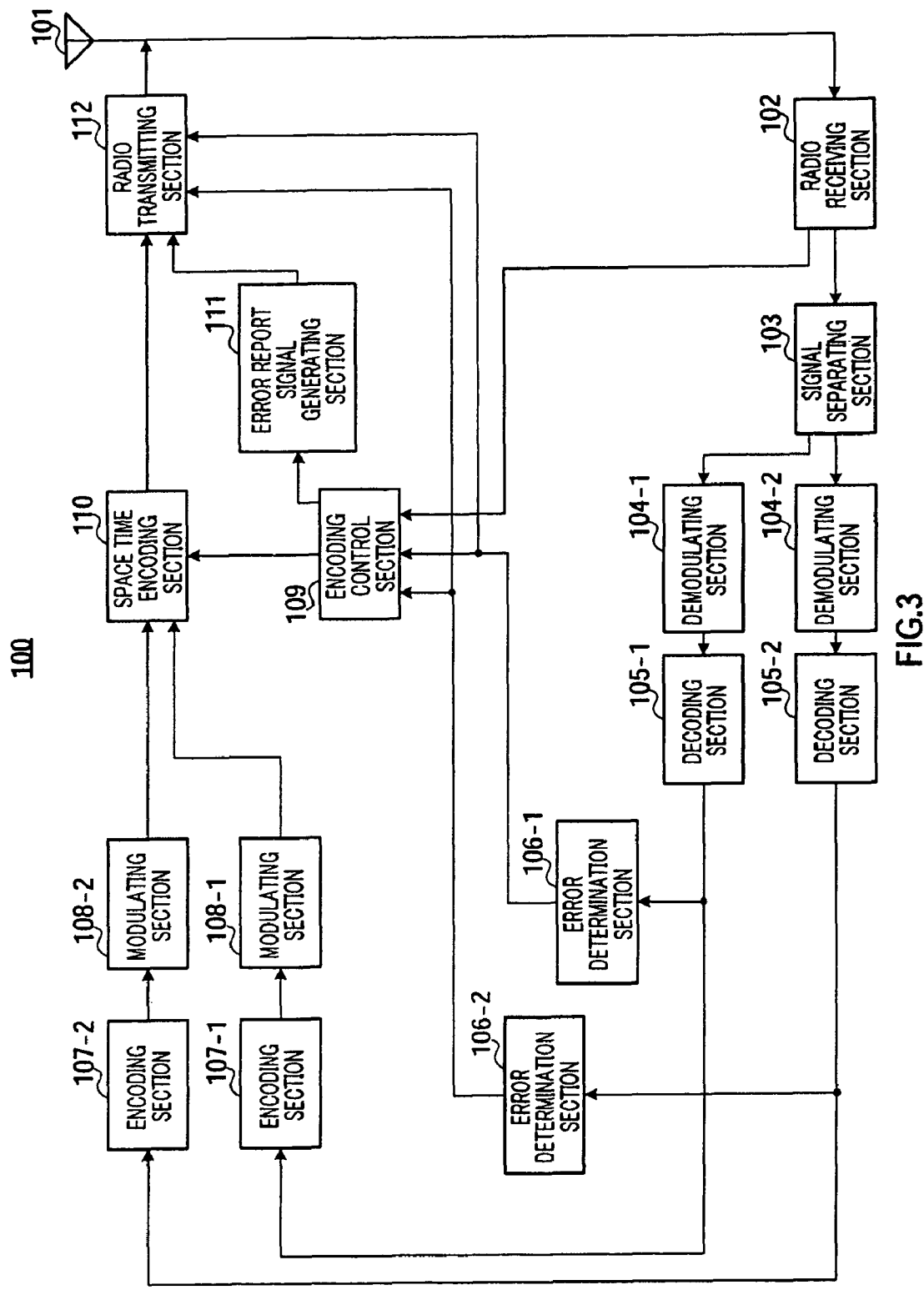
FIG. 3 is a configuration diagram of the relay station according to Embodiment 1.

Next, the configuration of the relay station according to the present embodiment will be explained. FIG. 3 shows the configuration of the relay station 100 of the present embodiment. Above-described relay station 1 and relay station 2 have the same configuration. The following explanation will be limited to uplink relay transmission, but downlink relay transmission may be carried out in a similar manner with uplink relay transmission.

In relay station 100, radio receiving section 102 receives signals S1 and S2 from the mobile stations and encoding information from the base station via antenna 101, performs radio processing including down-conversion, and outputs the signals and the encoding information. Radio receiving section 102 outputs S1 and S2 to signal separating section 103 and the encoding information to encoding control section 109.

The encoding information shows that, when there are no errors in S1 and S2, which relay station performs space time encoding generating which signal sequence. That is, the encoding information shows that, when there are no errors in S1 and S2, relay station 1 performs encoding generating the first row of matrix A and relay station 2 performs encoding generating the second row of matrix A.

Signal separating section 103 separates S1 and S2, outputs S1 to demodulating section 104-1 and S2 to demodulating section 104-2.

Demodulating section 104-1 demodulates S1, and decoding section 105-1 decodes demodulated S1 and outputs decoding result S1 to error determination section 106-1 and encoding section 107-1.

Demodulating section 104-2 demodulates S2, and decoding section 105-2 decodes demodulated S2 and outputs decoding result S2 to error determination section 106-2 and encoding section 107-2.

Error determination section 106-1 determines whether or not there is no error in the decoding result S1 using CRC and outputs the determination result (i.e. "NG" when there is an error and "OK" when there is no error) to encoding control section 109 and radio transmitting section 112.

Error determination section 106-2 determines whether or not there is an error in the decoding result S2 using CRC and outputs the determination result (i.e. "NG" when there is an error and "OK" when there is no error) to encoding control section 109 and radio transmitting section 112.

Encoding section 107-1 encodes decoding result S1 again, and modulating section 108-1 modulates encoded S1 again.

Encoding section 107-2 encodes decoding result S2 again, and modulating section 108-2 modulates encoded S2 again.

Based on the error determination results of decoding results S1 and S2, encoding control section 109 determines that the signals without errors are relayed, and determines that space time encoding section 110 performs encoding generating which signal sequence (i.e. the first or second row of matrix A) and commands space time encoding section 110. Moreover, in the event that there is an error in either decoding result S1 or decoding result S2, encoding control section 109 commands error report signal generating section 111 to generate a report signal (error report signal) to report that event.

As described above, space time encoding section 110 encodes only the signal without an error in S1 and S2 after modulation according to the command from encoding control section 109, and outputs the encoded signal to radio transmitting section 112.

Error report signal generating section 111 generates an error report signal according to encoding control section 109, and outputs the error report signal to radio transmitting section 112.

Radio transmitting section 112 performs radio processing including up-conversion on the encoded signal and the error report signal and transmits them to the base station via antenna 101. However, radio transmitting section 112 does not transmit the signals when there are errors in both decoding results S1 and S2. That is, the relay transmission is canceled in this case.

Figure 4:
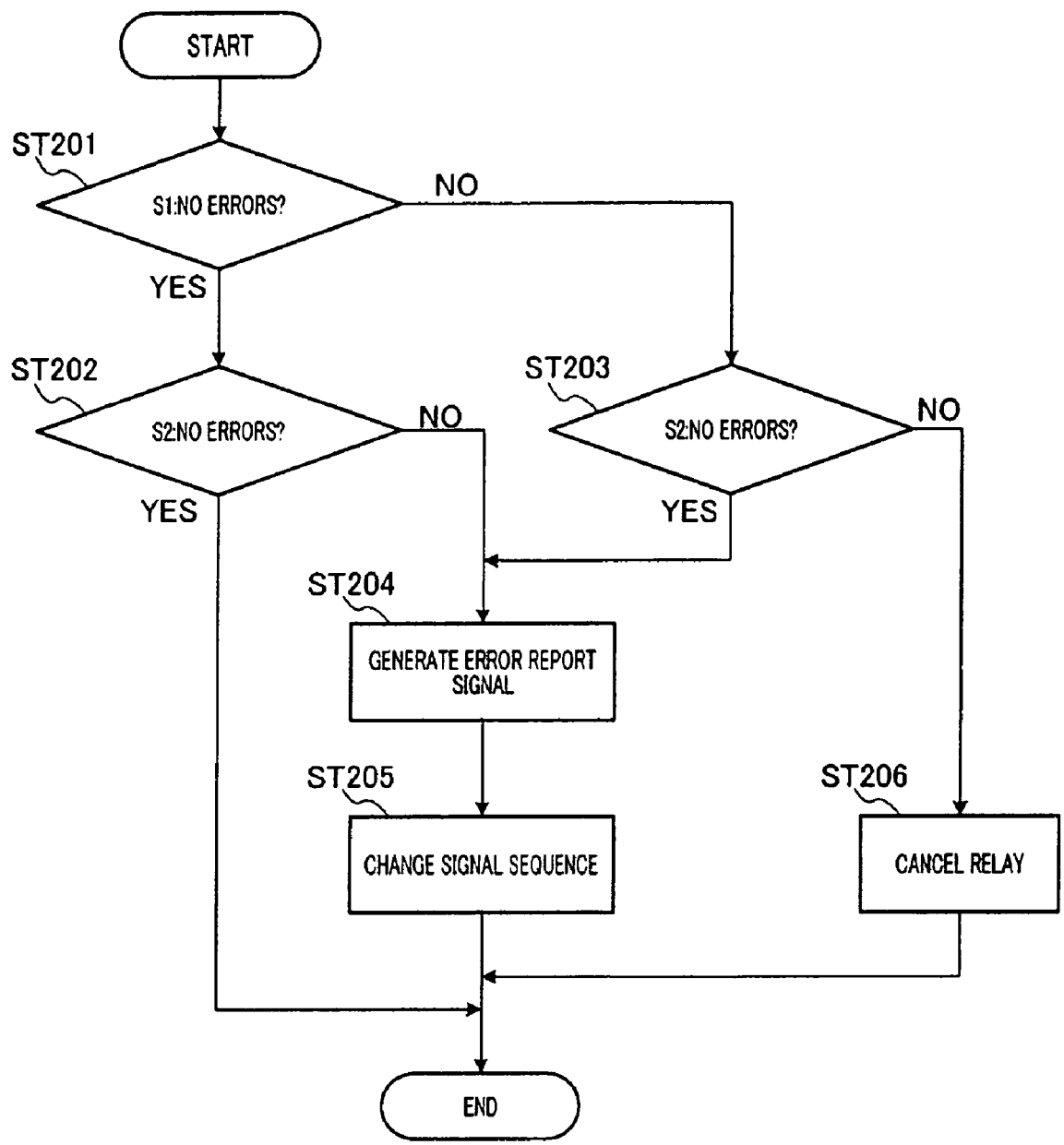
FIG. 4 is a flow chart of the operations of the relay station according to Embodiment 1.

Next, the processing flow in relay station 100 will be explained using the flow chart in FIG. 4.

When there is no error in S1 in ST201 and when there is no error in S2 in ST202, that is, when there are no errors in S1 and S2, the signal sequence is not changed. That is, in this case, for example, encoding control section 109 of relay station 1 commands space time encoding section 110 to perform encoding generating the first row of matrix A. According to this command, space time encoding section 110 of relay station 1 generates the first row of matrix A through encoding S1 and S2.

When there is no error in S1 in ST201 and there is an error in S2 in ST202, and, when there is an error in S1 in ST201 and there is no error in S2 in ST203, that is, when there is an error in only one of S1 and S2, the error report signal is generated in ST204 and the signal sequence is changed in ST205. That is, in this case, for example, encoding control section 109 of relay station 1 commands space time encoding section 110 to encode only the signal without an error and to generate the second row of matrix A through encoding only the signal without an error. According to this command, space time encoding section 110 of relay station 1 generates the second row of matrix A through encoding only the signal without an error in S1 and S2.

When there is an error in S1 in ST201 and there is an error in S2 in ST203, that is, when there are errors both in S1 and S2, the relay transmission is canceled in ST206.

Figure 5:
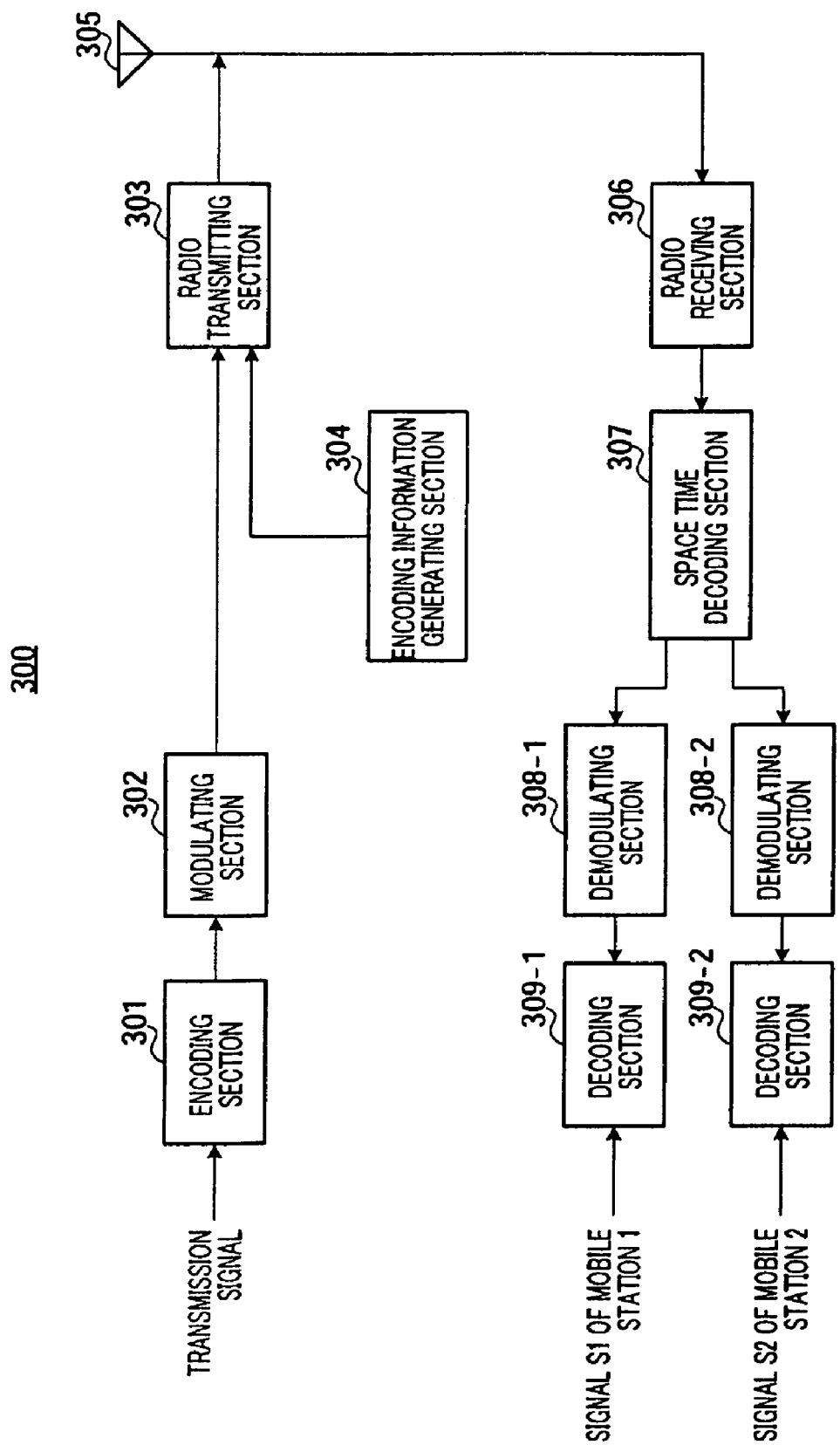
FIG. 5 is a configuration diagram of the base station according to Embodiment 1.

Next, the configuration of the base station according to the present embodiment will be explained. FIG. 5 shows the configuration of base station 300.

In base station 300, encoding section 301 encodes a transmission signal, modulating section 302 modulates the encoded transmission signal and outputs the modulated transmission signal to radio transmitting section 303.

Encoding information generating section 304 generates encoding information and outputs the encoding information to radio transmitting section 303.

Radio transmitting section 303 performs radio processing including up-conversion on the transmission signal and the encoding information, and transmits them from antenna 305.

Radio receiving section 306 receives the relay signal and the error report signal from relay station 100 via antenna 305, performs radio processing including down-conversion and outputs the relay signal and the error report signal.

When there is not an error report signal, space time decoding section 307 decodes the relay signal assuming encoded using STBC. When there is an error report signal, space time decoding section 307 decodes the relay signal assuming transmitted with diversity. The decoded signal is separated into S1 and S2 and outputted to demodulating section 308-1 and 308-2, respectively.

Demodulating section 308-1 demodulates S1 and decoding section 309-1 decodes demodulated S1.

Demodulating section 308-2 demodulates S2 and decoding section 309-2 decodes demodulated S2.

Figure 6:
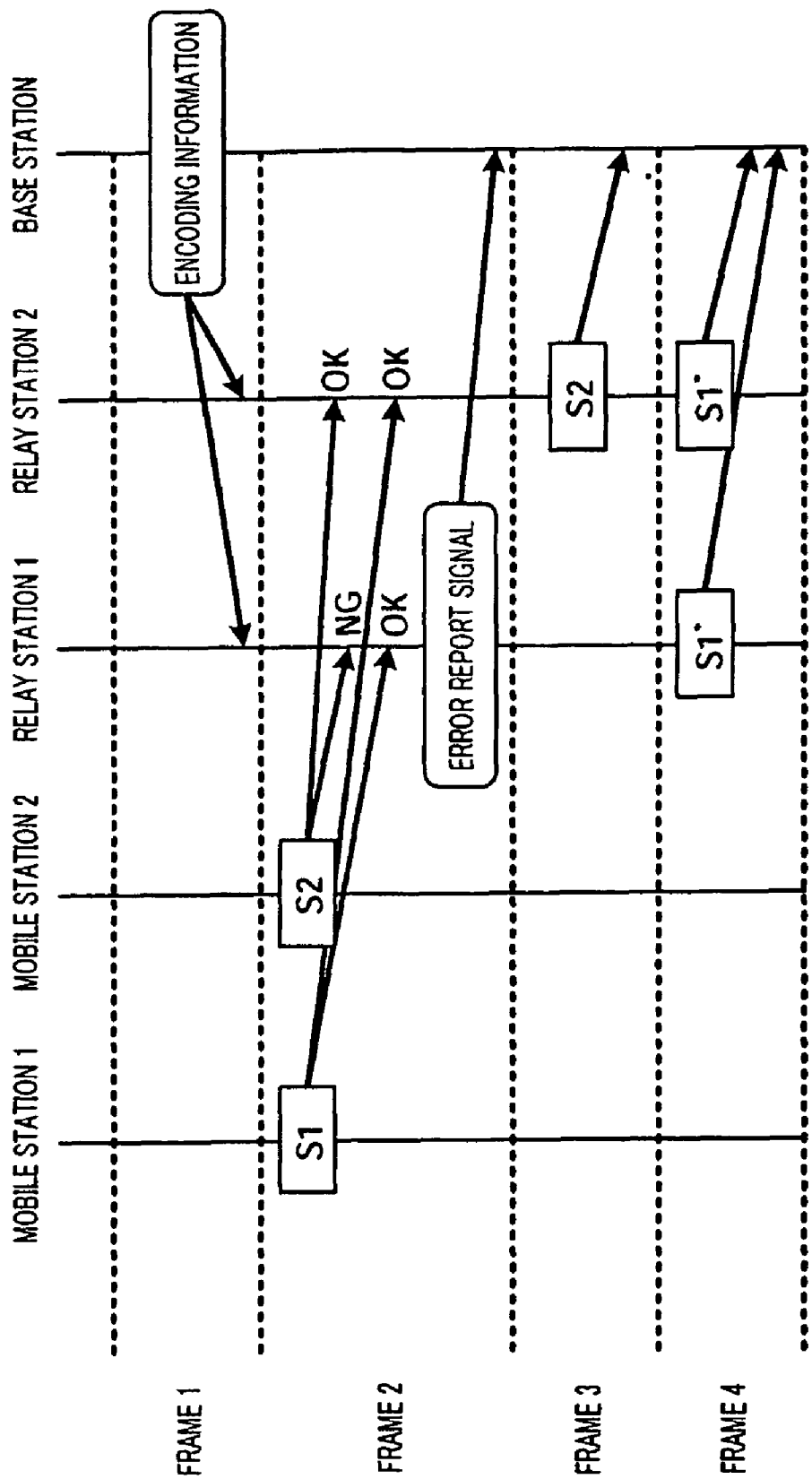
FIG. 6 is a sequence diagram according to Embodiment 1.

Next, FIG. 6 shows the sequence diagram where there is no error in S1 and there is an error in S2 in relay station 1, and where there are no errors in S1 and S2 in relay station 2.

In frame 1, the base station transmits encoding information to relay station 1 and relay station 2.

In frame 2, mobile station 1 and mobile station 2 transmit S1 and S2 to relay station 1 and relay station 2, respectively. Relay station 1 and relay station 2 perform CRC on S1 and S2. In relay station 1, the CRC of S2 shows "NG," and so relay station 1 transmits an error report signal to the base station. Moreover, relay station 1 changes the signal sequence from the first row of matrix A to the second row of matrix A. Relay station 2 does not change the signal sequence of the second row of matrix A.

In frame 3 (at time t above), relay station 2 transmits S2 generated by encoding generating the second row of matrix A.

In frame 4 (at time t+T above), each of relay station 1 and relay station 2 transmits S1* generated by encoding generating the second row of matrix A.

Relay station 100 may transmit the error report signal in attachment of other signals. For example, relay station 100 may transmit the error report signal in attachment of S1 or S2.

Moreover, base station 300 may transmit encoding information at regular intervals or only when the content of the encoding information changes.

Figure 7:
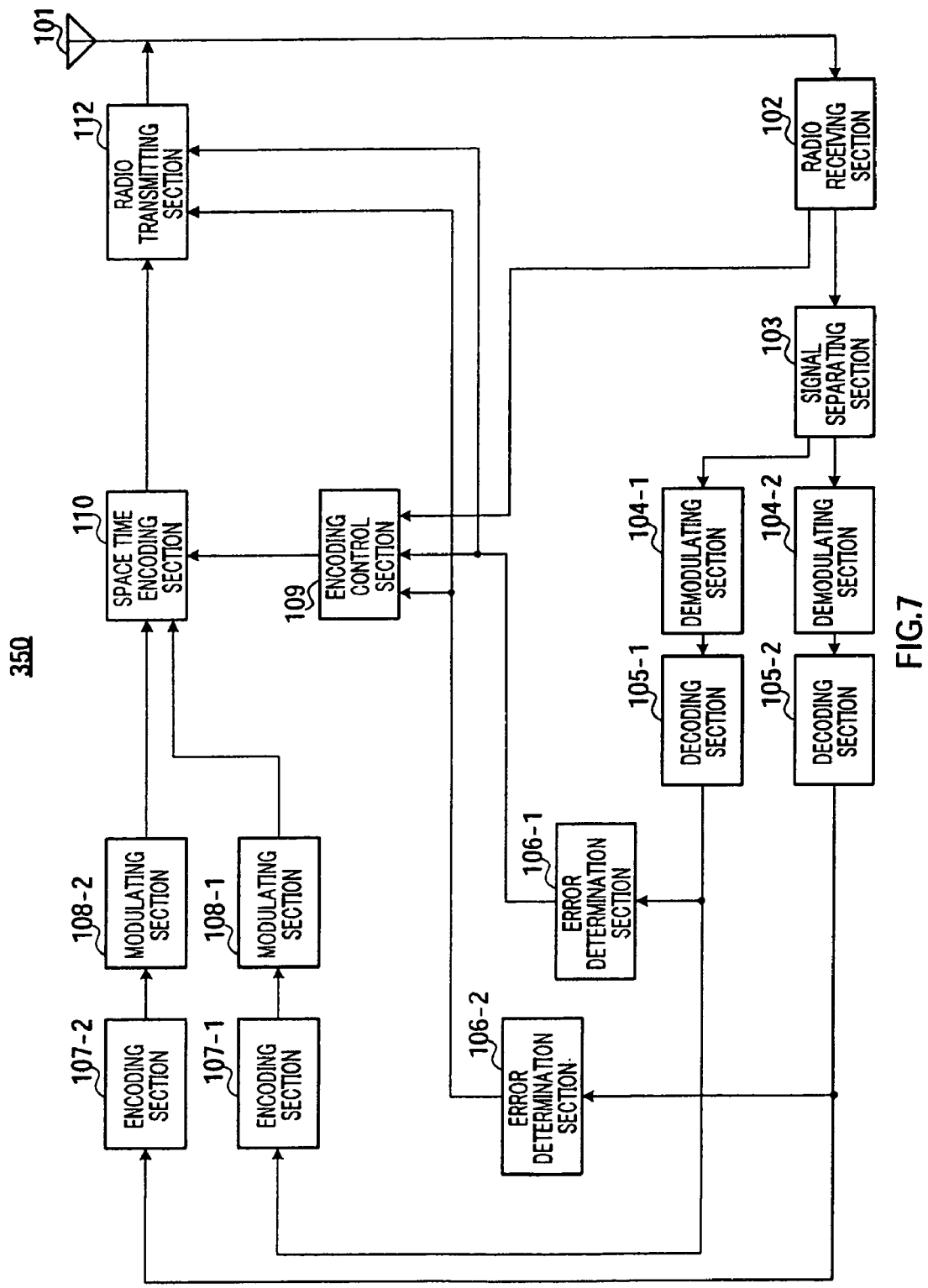
FIG. 7 is a configuration diagram of the relay station according to Embodiment 1.

Moreover, with the present embodiment, to simplify processing in space time decoding section 307 of base station 300, relay station 100 transmits the error report signal to base station 300. However, generation and transmission of the error report signal in relay station 100 are not required when space time decoding section 307 can estimate by blind estimation whether the relay signal is encoded by STBC or transmitted with diversity. Accordingly, the configuration of the Relay station of this case is shown in FIG. 7. Relay station 350 shown in FIG. 7 is provided by removing error report signal generating section 111 from relay station 100 shown in FIG. 3. In the embodiments below, space time decoding section 307 is capable of estimating by blind estimation whether a relay signal is encoded by STEC or transmitted with diversity.

Embodiment 2

The present embodiment is different from Embodiment 1 in that, when there is an error in either S1 or S2, relay station 1 receives from relay station 2 a signal relayed by relay station 2 and prepares for a retransmission request from the base station. By this means, relay station 1 can receive the same signal as a signal not transmitted by relay station 1 due to errors, so that relay station 1 can relay a signal received from relay station 2 to the base station when the base station requests a retransmission.

Figure 8:
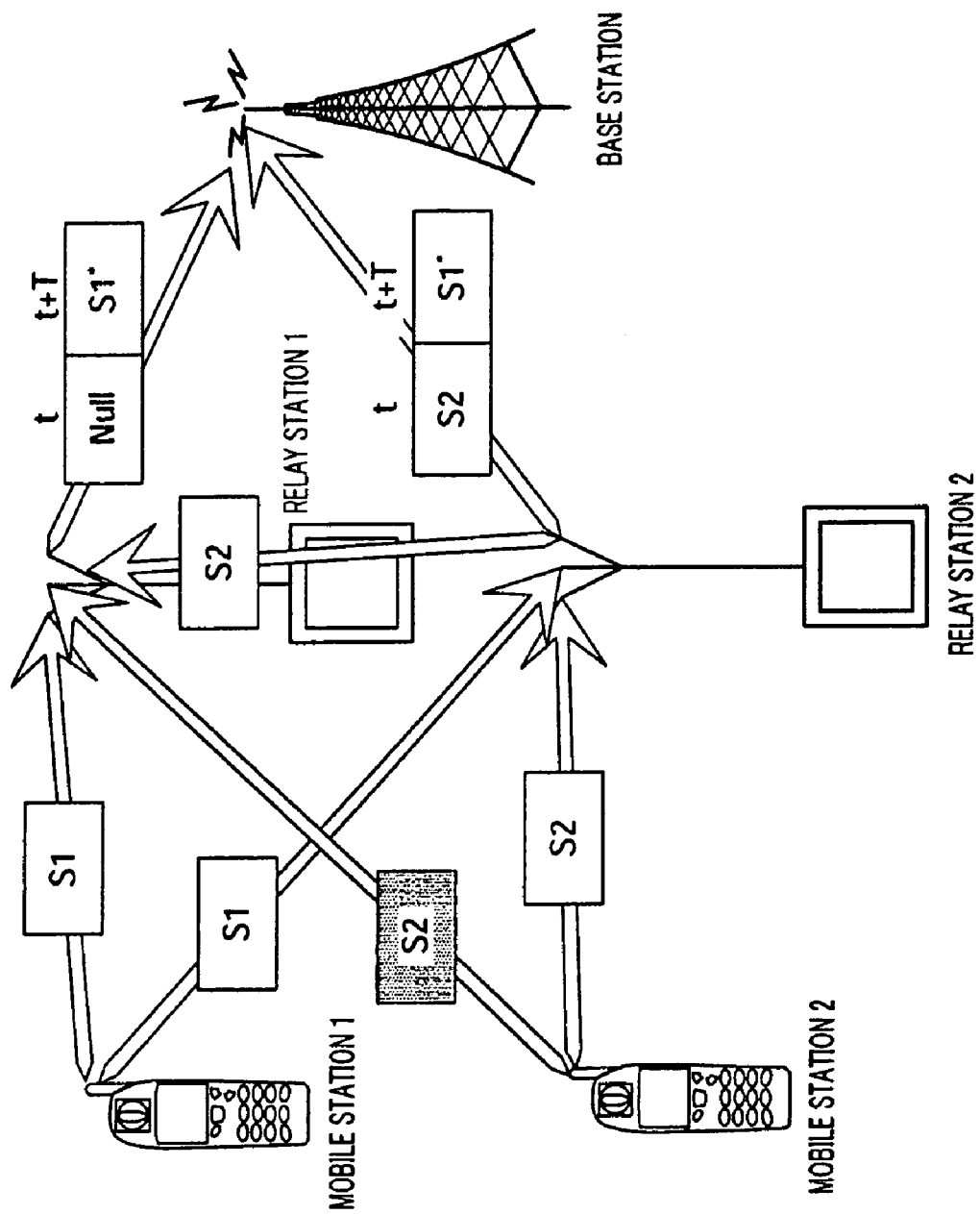
FIG. 8 shows the mobile communication system according to Embodiment 2.

For example, as shown in FIG. 8, when there is no error in S1 and there is an error in S2, relay station 1 receives S2 that relay station 2 relays to the base station at time t when relay station 1 does not relay. Moreover, when there is no error in S2 received from relay station 2, relay station 1 stores S2 in a buffer. Then, relay station 1 transmits S2 stored in the buffer to the base station upon receiving are transmission request from the base station. The rest of the present embodiment is the same as in Embodiment 1.

Figure 9:
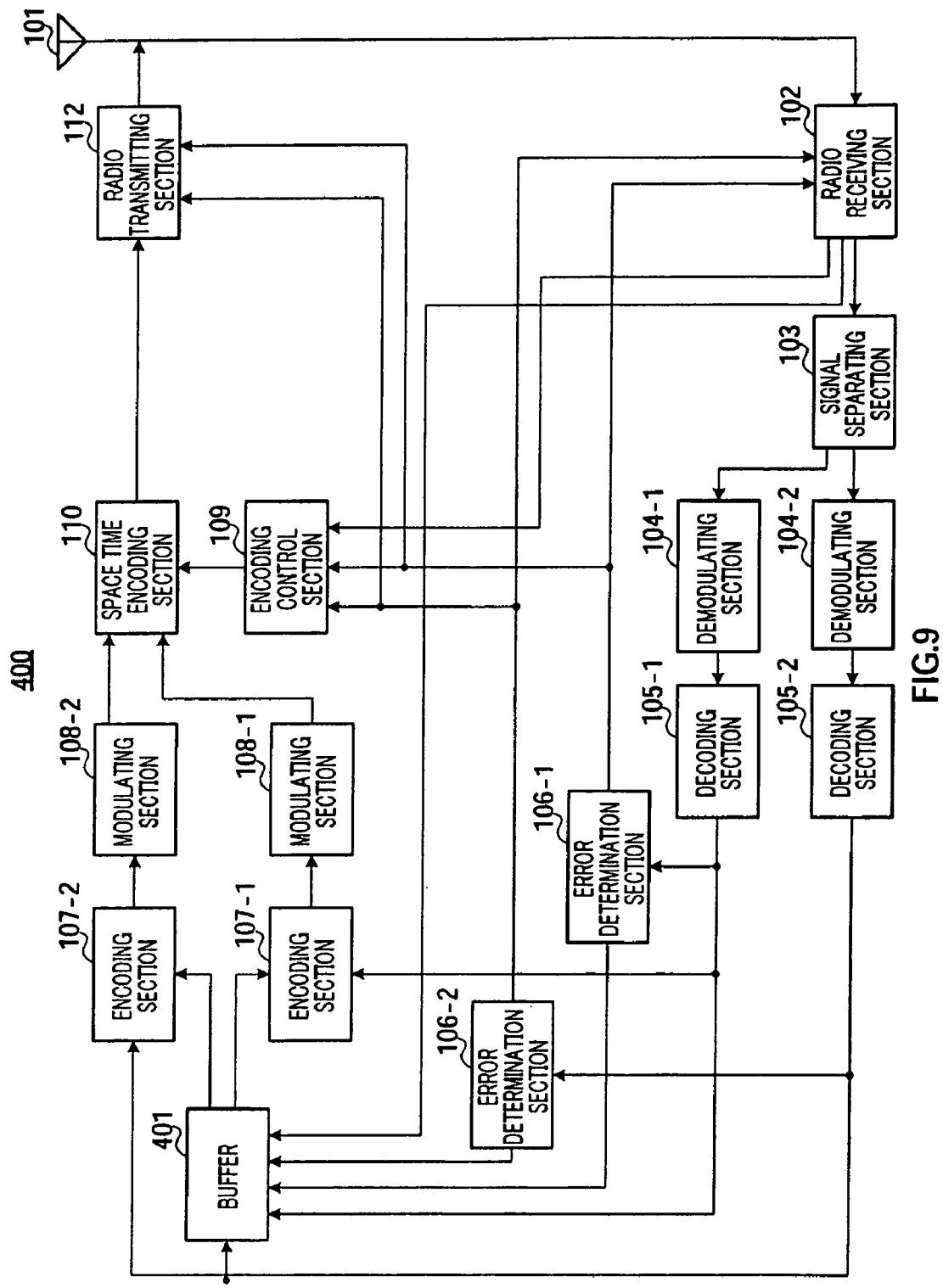
FIG. 9 is a configuration diagram of the relay station according to Embodiment 2.

Next, the configuration of the relay station according to the present embodiment will be explained. FIG. 9 shows the configuration of the relay station 400 of the present embodiment. For the same components as in Embodiment 1, the description will be omitted.

Error determination sections 106-1 and 106-2 output determination results to radio receiving section 102 and buffer 401.

Radio receiving section 102 receives the same signal as the signal with an error from other relay station and outputs the same signal to signal separating section 103. Moreover, radio receiving section 102 outputs the retransmission request received from the base station, to buffer 401.

Buffer 401 stores the decoding result without errors alone out of the decoding result outputted from decoding sections 105-1 and 105-2. Then, when the retransmission request is inputted, buffer 401 outputs the decoding result according to the retransmission request in the stored decoding results, to encoding sections 107-1 and 107-2. That is, buffer 401 outputs decoding result S1 without errors to encoding section 107-1 when the retransmission of S1 is requested from the base station, and outputs decoding result S2 without errors to encoding section 107-2 when the retransmission of S2 is requested from the base station.

Figure 10:
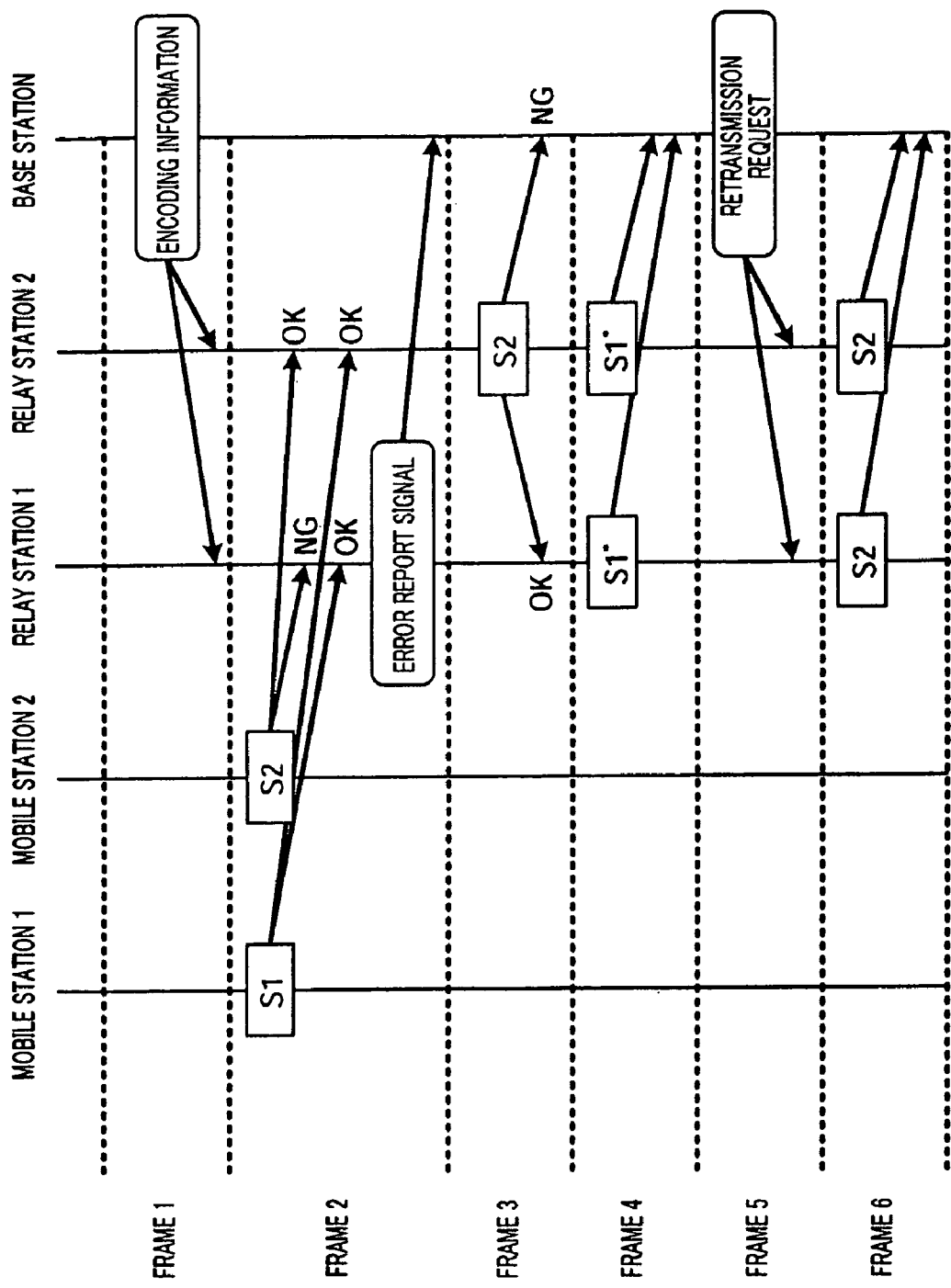
FIG. 10 is a sequence diagram according to Embodiment 2.

Next, FIG. 10 shows the sequence diagram where there is no error in S1 and there is error in S2 in relay station 1, and where there are no errors in S1 and S2 in relay station 2. The processing in frames 1, 2 and 4 will be the same as in Embodiment 1 and description thereof will be omitted.

In frame 3 (at time t above), relay station 2 transmits S2 generated by encoding generating the second row of matrix A, and the base station and relay station 1 receive S2. It is assumed that the CRC result of S2 received in the base station is "NG" and the CRC result of S2 received in relay station 1 is "OK."

In frame 5, the base station transmits a retransmission request of S2.

In frame 6, relay stations 1 and 2 transmit S2 according to the retransmission request.

In this way, according to the present embodiment, even when a signal of CRC becomes "NG," if the relay station receives the same signal as the signal from other relay stations and the CRC becomes "OK," the relay station can transmit that signal to the base station when the relay station receives the retransmission request from the base station.

Embodiment 3

The present embodiment is different from Embodiment 1 in assigning different priorities to relay stations 1 and 2, so that, when there is no error in the signal scheduled to be transmitted at time t and there is an error in the signal scheduled to be transmitted at time t+T, the relay station of the lower priority checks whether or not the relay station of the higher priority performs relay transmission at time t and then performs relay transmission. By this means, when there are errors in signals from different mobile stations in relay stations 1 and 2, it is possible to prevent relay stations 1 and 2 from transmitting different signals at t+T.

Figure 11:
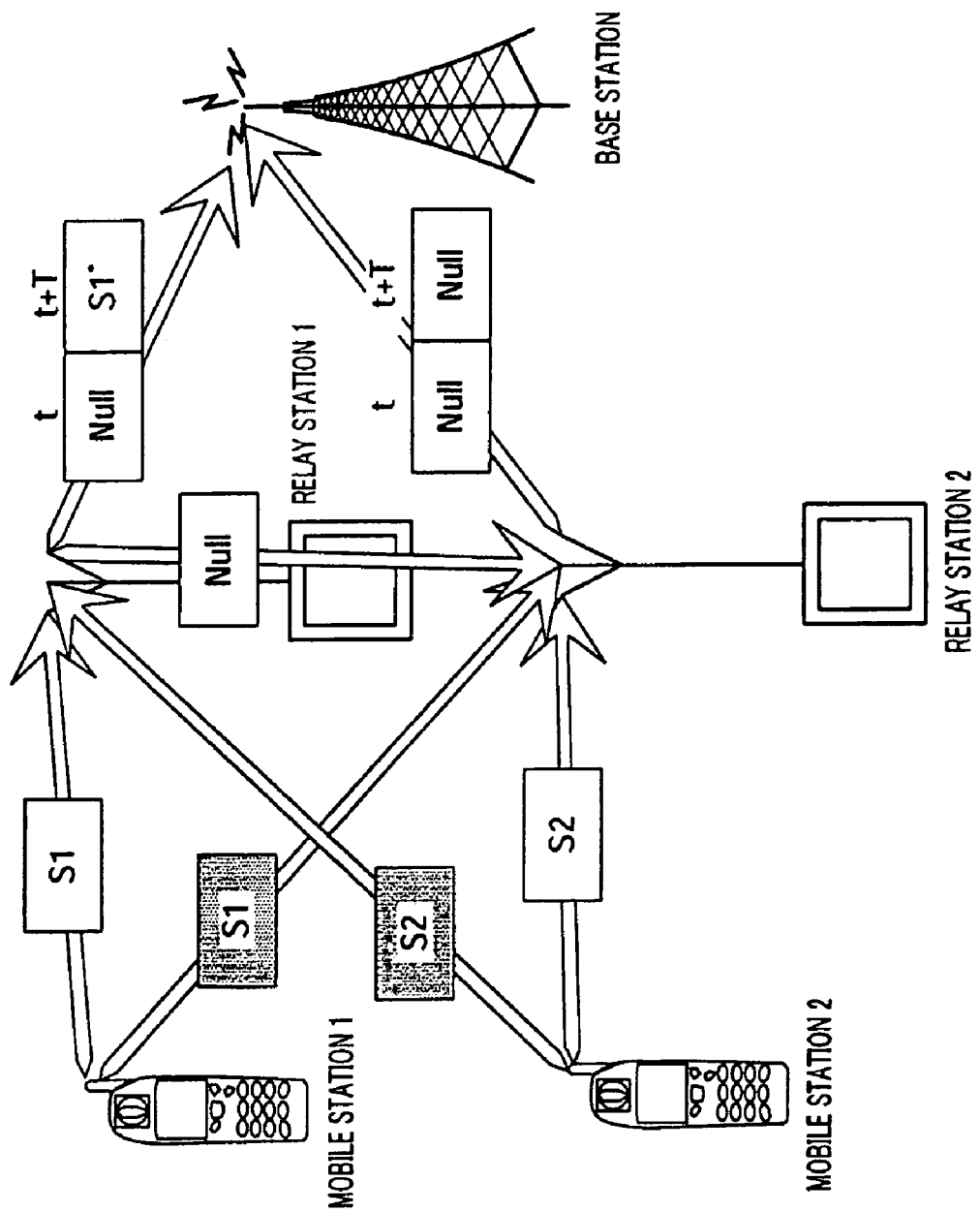
FIG. 11 shows the mobile communication system according to Embodiment 3.

For example, if the priority of relay station 1 is high and the priority of relay station 2 is low, as shown in FIG. 11, when there is no error in S2 scheduled to be transmitted at time t and there is an error in S1 scheduled to be transmitted at time t+T, relay station 2 receives the signal from relay station 1 at time t and checks whether or not relay station 1 has changed the signal sequence and relayed the changed signal sequence.

The example shown in FIG. 11, relay station 2 receives nothing from relay station 1 at time t, so that relay station 2 can assume that there is an error in S2 alone or there are errors in both S1 and S2 in relay station 1. Accordingly, relay station 2 can assume that relay station 1 transmits S1* at time t+T or does not perform relay transmission. To prevent collision of S1* from relay station 1 and S2 from relay station 2, relay station 2 does not transmit S2 at time t+T.

Moreover, when relay station 2 receives the signal from relay station 1 at time t, relay station 2 can assume that there are no errors in S1 and S2 or there is an error in either S1 or S2 in relay station 1. Accordingly, relay station 2 can assume that relay station 1 transmits either S1 or −S2* at time t. In this case, relay station 2 changes the signal sequence and transmits −S2 at time t+T. In case there are no errors in S1 and S2 in relay station 1, relay station 2 transmits −S2* at time t+T, thereby obtaining diversity effect at time t+T. Moreover, in case there is an error in S1 alone in relay station 1, relay station 1 transmits −S2* at time t and does not perform relay transmission at t+T, so that −S2* transmitted at time t+T by relay station 2 is received by the base station without interference.

FIG. 12 shows a summary of the operations of relay station 2.

When there is an error in S2 scheduled to be transmitted at time t and there is no error in S1 scheduled to be transmitted at time t+T, and nothing is received from relay station 1 at time t, relay station 2 can assume that relay station 1 transmits S1* at time t+T or does not perform relay transmission. Accordingly, relay station 2 may transmit S1* at time t+T in this case. Considering this operation, FIG. 12 is as shown in FIG. 13.

Moreover, when there is an error in S2 scheduled to be transmitted at time t and there is no error in S1 scheduled to be transmitted at time t+T, relay station 2 may operate according to Embodiment 1, and operate according to the present embodiment only when there is no error in S2 scheduled to be transmitted at time t and there is an error in S1 scheduled to be transmitted at time t+T.

Figure 14:
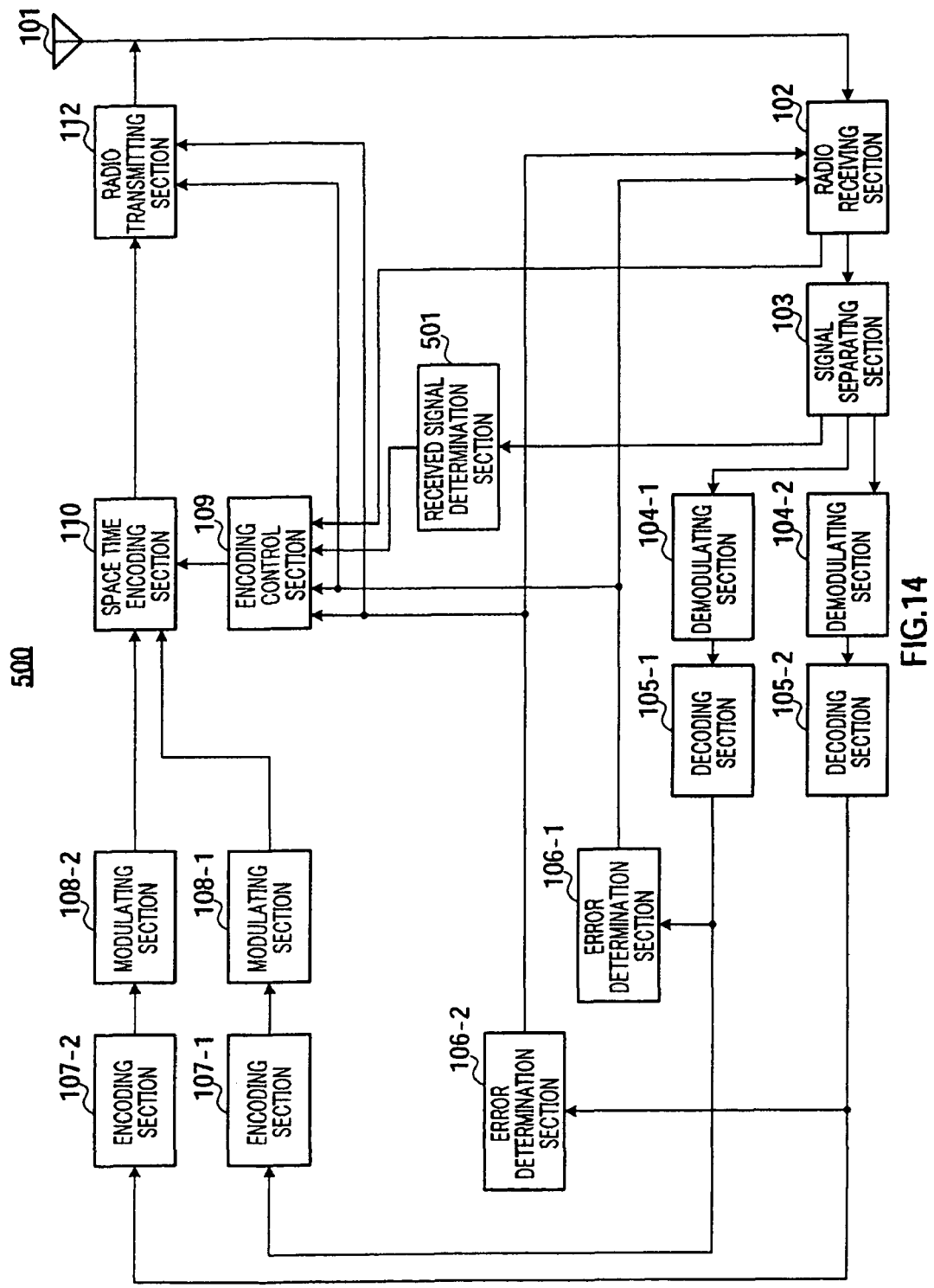
FIG. 14 shows a configuration diagram of the relay station according to Embodiment 3.

Next, the configuration of the relay station of the lower priority according to the present embodiment will be explained below. FIG. 14 shows the configuration of relay station 500 of lower priority according to the present embodiment. For the same components as in Embodiment 1, the description will be omitted. The configuration of the relay station of the higher priority according to the present embodiment is the same as in Embodiment 1.

Error determination sections 106-1 and 106-2 also output determination results to radio receiving section 102.

When "NG" is inputted from error determination sections 106-1 and 106-2, radio receiving section 102 receives the signal that the relay station of the higher priority transmits at time t, and outputs the signal to signal separating section 103.

Signal separating section 103 separates the inputted signal and outputs the separated signal also to received signal determination section 501.

Based on whether or not there is a received signal at time t, received signal determination section 501 determines whether or not the relay station of the higher priority transmits a signal at time t, and outputs the determination result to encoding control section 109.

Encoding control section 109 controls space time encoding section 110 based on the determination result so as to transmit a signal at time t+T as shown in FIG. 12.

Embodiment 4

The present embodiment is different from Embodiment 1 in assigning different priorities to relay stations 1 and 2, so that, when there is an error in the signal scheduled to be transmitted at time t and there is no error in the signal scheduled to be transmitted at time t+T, the relay station of the lower priority determines that the relay station of the higher priority transmits which signal at time t, checks whether or not the relay station of the higher priority changes the signal sequence, relays the changed signal sequence based on the determination result, and then performs relay transmission. By this means, when there are errors in signals from different mobile stations in relay stations 1 and 2, it is possible to prevent relay stations 1 and 2 from transmitting different signals at time t.

Figure 15:
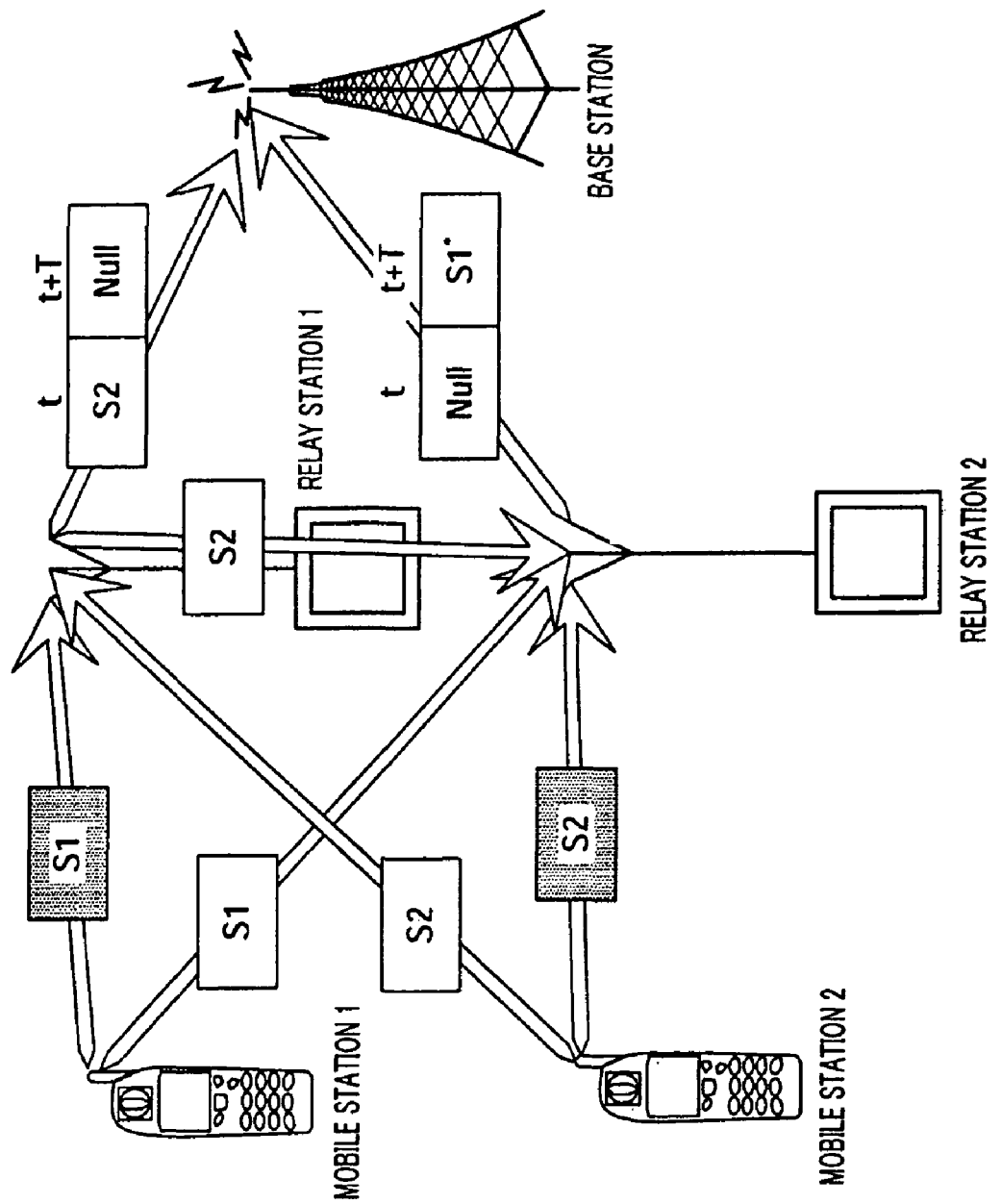
FIG. 15 shows the mobile communication system according to Embodiment 4.

If the priority of relay station 1 is higher and the priority of relay station 2 is lower, when there is an error in S2 scheduled to be transmitted at time t and there is no error in S1 scheduled to be transmitted at time t+T in the relay station 2, as shown in FIG. 15, relay station 2 receives the signal from relay station 1 at time t and checks whether or not relay station 1 has changed the signal sequence and relayed the changed signal sequence.

The example shown in FIG. 15, relay station 2 receives S2 from relay station 1 at time t, so that relay station 2 can assume that there is an error in S1 alone in relay station 1. Then, to prevent collision of S2 from relay station 1 and S1 from relay station 2, relay station 2 transmits S1* at time t+T without changing the signal sequence.

Moreover, when relay station 2 receives S1 from relay station 1 at time t, relay station 2 can assume that there are no errors in S1 and S2 in relay station 1. Relay station 2 cannot relay S2* scheduled to be transmitted at time t+T by relay station 1 because of errors in S2 in relay station 2, and so relay station 2 cancels the relay transmission in this case.

FIG. 16 shows a summary of the operations of relay station 2. These operations make it possible to prevent different signals from colliding at time t even when there is an error in S1 in relay station 1 of the higher priority. Moreover, it is possible to obtain diversity gain of S1 transmitted at time t+T when there is an error in S2 in relay station 1 of the higher priority.

Figure 17:
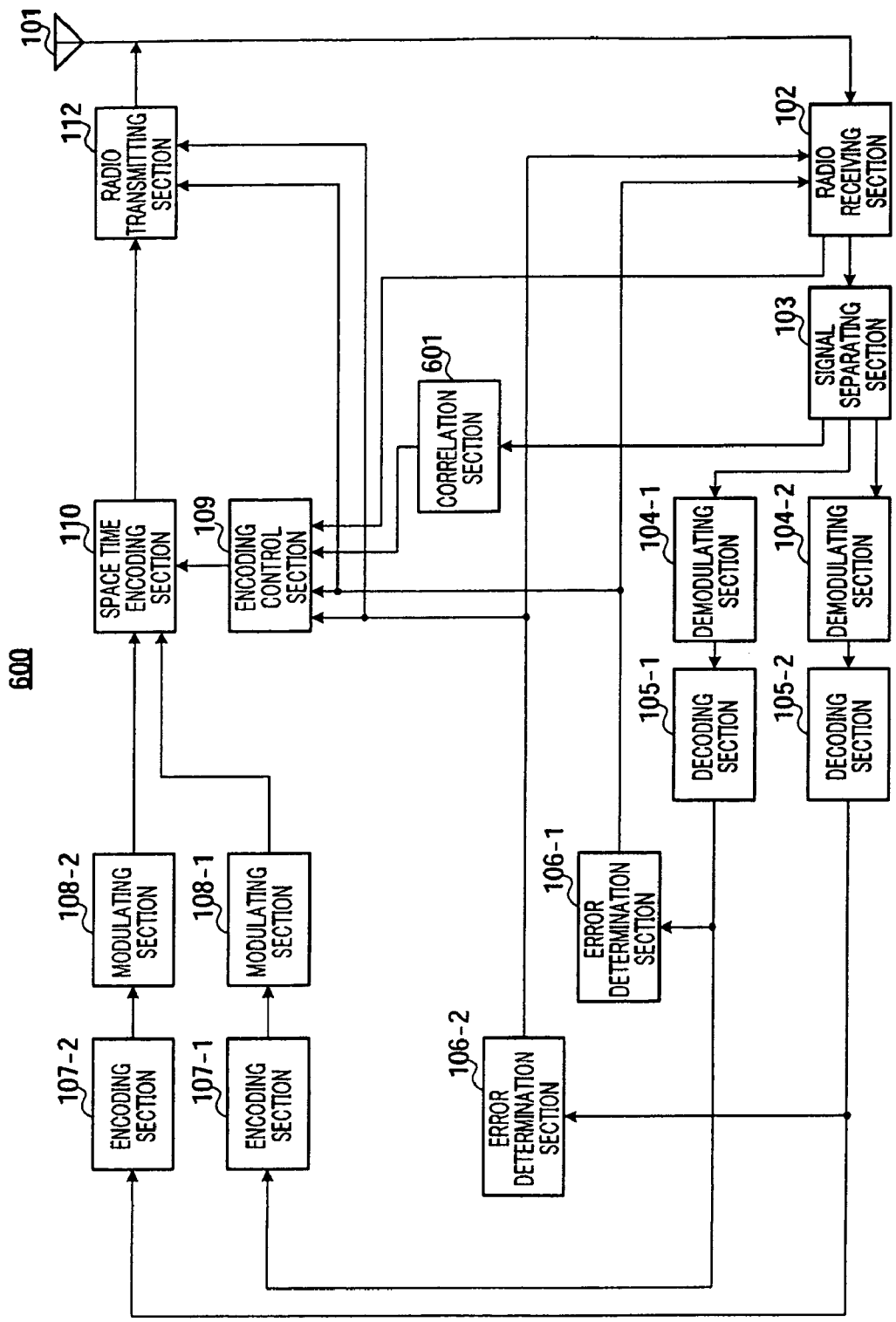
FIG. 17 is a configuration diagram of the relay station according to Embodiment 4.

Next, the configuration of the relay station of the lower priority according to the present embodiment will be explained below. FIG. 17 shows the configuration of relay station 600 of the lower priority according to the present embodiment. For the same components as in Embodiment 1, the description will be omitted. The configuration of the relay station of the higher priority according to the present embodiment is the same as in Embodiment 1.

Error determination sections 106-1 and 106-2 also output the determination results to radio receiving section 102.

When "NG" is inputted from error determination sections 106-1 and 106-2, radio receiving section 102 receives the signal that the relay station of the higher priority transmits at time t, and outputs the signal to signal separating section 103.

Signal separating section 103 separates the inputted signal and outputs the separated signal also to correlation section 601.

Correlation section 601 assumes the signal that the relay station of the higher priority transmits at time t+T by correlating the received signal from the mobile station and the received signal at time t from the relay station of the higher priority and by determining whether or not these signals are the same according to the level of correlation. Correlation section 601 determines these signals are the same when the correlation is higher than a threshold.

Moreover, encoding control section 109 controls space time encoding section 110 based on the assumption result so as to transmit the signal at time t+T as shown in FIG. 16.

Moreover, relay station 600 may assume the signal that the relay station of the higher priority transmits at time t+T as above by receiving an error report signal from the relay station of the higher priority and by determining that the received signal from the mobile station and the received signal at time t from the relay station of the higher priority are the same based on the error report signal.

Embodiments of the present invention have been explained.

Although with the embodiments, signal sequences in Alamouti coding have been used as STBC, other coding sequences to fulfill the requirements of equation 7 may be used as STBC.

[2]

$$XX^H = (|S1|^2 + |S2|^2)I \qquad \text{(Equation 7)}$$

In equation 7, S1, S1*, S2 and S2* are arranged in matrix X in two columns and two rows as below. Moreover, S1 and S1*, and S2 and S2* are arranged on a diagonal line. Furthermore, S1, S1*, S2 and S2 may be multiplied by −1.

[3]

$$X = \begin{bmatrix} -S1 & S2^* \\ -S2 & -S1^* \end{bmatrix}_{\downarrow \text{space}}^{\text{time} \rightarrow \; t \quad t+T}$$

where the horizontal dimension represents time ("time→") and the vertical dimension representing space ("↓space").

$$X = \begin{bmatrix} -S2^* & S1 \\ S1^* & S2 \end{bmatrix}_{\downarrow \text{space}}^{\text{time} \rightarrow \; t \quad t+T}$$

where the horizontal dimension represents time ("time→") and the vertical dimension representing space ("↓space").

$$X = \begin{bmatrix} S2^* & -S1 \\ -S1^* & -S2 \end{bmatrix}_{\downarrow \text{space}}^{\text{time} \rightarrow \; t \quad t+T}$$

where the horizontal dimension represents time ("time→") and the vertical dimension representing space ("↓space").

Further, only one of relay station 1 and relay station 2 may adopt the configuration of the embodiments. Further, with the above embodiments, the number of relay stations may be equal to three or more.

Further, CRC is used for error determination in the embodiments, and other determination methods may be used.

Moreover, with the embodiments, additional relay stations may be placed between the relay station and the base station or between the mobile station and the relay station.

Further, although the frames are continuous in the sequence diagrams of the embodiments, there may be other frames (not shown) between the frames.

Moreover, the base station and the mobile station according to the embodiments may be referred to as "Node B," and "UE," respectively. Furthermore, the relay station according to the embodiments is referred to as "repeater," "simple base station," "cluster head," and so on.

Moreover, although cases have been described with the embodiments above where the present invention is configured by hardware, the present invention may be implemented by software in combination with hardware.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-100830, filed on Mar. 31, 2006, including the specification, drawings and abstract, is incorporated herein by reference in its entirety.

INDUSTRIAL APPLICABILITY

The present invention is applicable to communication systems in which radio communication apparatuses such as mobile stations and base stations carry out radio communication through relay stations (for example, multihop systems).

The invention claimed is:

1. A radio communication apparatus that performs relay transmission, comprising:
    a receiving section that receives a plurality of signals;
    a determination section that determines whether or not there are errors in the plurality of signals;
    an encoding section that, when there are no errors in the plurality of signals, encodes the plurality of signals by encoding for generating a second signal sequence different from a first signal sequence used in another radio communication apparatus performing relay transmission, and that, when there are errors in one of the plurality of signals, encodes only signals without errors by encoding for generating the first signal sequence; and
    a transmitting section that transmits the encoded signal.

2. The radio communication apparatus according to claim 1, further comprising a generating section that, in an event that there are errors in one of the plurality of signals, generates a report signal for reporting the event,
    wherein the transmitting section transmits the report signal.

3. The radio communication apparatus according to claim 1, wherein, when there are errors in one of the plurality of signals, the receiving section receives a signal subjected to relay transmission from another radio communication apparatus.

4. The radio communication apparatus according to claim 1, wherein, when there are no errors in a signal scheduled to be transmitted at a first time, there are errors in a signal scheduled to be transmitted at the second time later than the first time, priority of the radio communication apparatus is lower than priority of the another radio communication apparatus, and the another radio communication apparatus performs relay transmission at the first time, the transmitting section transmits a signal generated by the encoding for generating the first signal sequence at a second time.

5. The radio communication apparatus according to claim 1, wherein when there are no errors in a signal scheduled to be transmitted at a first time, there are errors in a signal to be transmitted at a second time later than the first time, priority of the radio communication apparatus is lower than priority of the another radio communication apparatus, and the another radio communication apparatus transmits a signal generated using the encoding for generating the first signal sequence, the transmitting section transmits a signal generated by the encoding for generating the first signal sequence.

6. A radio communication method used in a radio communication apparatus that performs relay transmission, said radio communication apparatus implementing steps comprising:
receiving a plurality of signals;
determining whether or not there are errors in the plurality of signals;
when there are no errors in the plurality of signals, encoding the plurality of signals by encoding for generating a second signal sequence different from a first signal sequence used in another radio communication apparatus performing relay transmission, and, when there are errors in one of the plurality of signals, encoding only signals without errors by encoding for generating the first signal sequence; and
transmitting the encoded signal.

* * * * *